United States Patent
Pfaff et al.

(10) Patent No.: US 6,372,036 B1
(45) Date of Patent: Apr. 16, 2002

(54) PIGMENT PREPARATION AND ITS USE ESPECIALLY IN PRINTING INKS

(75) Inventors: Gerhard Pfaff, Munster; Sabine Schoen, Darmstadt, both of (DE); Norio Takahashi, Fukushima-pref (JP)

(73) Assignee: Merck Patent Gesellschaft Beschraenkter Haftung, Darmstadt (DE)

( * ) Notice: Subject to any disclaimer, the term of this patent is extended or adjusted under 35 U.S.C. 154(b) by 0 days.

(21) Appl. No.: 09/471,331

(22) Filed: Dec. 23, 1999

(30) Foreign Application Priority Data

Dec. 23, 1998 (EP) .............................. 98124476

(51) Int. Cl.⁷ ...................... C09D 17/00; C09D 11/02; C09D 5/36
(52) U.S. Cl. .................. 106/443; 106/415; 106/416; 106/459; 106/462; 106/474; 106/483; 106/494
(58) Field of Search ................................. 106/443, 459, 106/483, 462, 474, 494, 415, 416

(56) References Cited

U.S. PATENT DOCUMENTS

| 5,407,746 A | * | 4/1995 | Prengel et al. ............... 428/403 |
| 5,445,671 A | * | 8/1995 | Herget et al. ................ 523/171 |
| 5,672,200 A | * | 9/1997 | Heinz et al. ................. 106/403 |
| 5,945,035 A | * | 8/1999 | Vogt et al. ................ 252/520.1 |

FOREIGN PATENT DOCUMENTS

| EP | 763573 | * | 3/1997 |
| EP | 1013722 | * | 6/2000 |
| EP | 1013723 | * | 6/2000 |
| EP | 1013724 | * | 6/2000 |
| EP | 1013725 | * | 6/2000 |
| EP | 1045014 | * | 10/2000 |

* cited by examiner

*Primary Examiner*—Anthony Green
(74) *Attorney, Agent, or Firm*—Millen, White, Zelano & Branigan, P.C.

(57) ABSTRACT

The present invention relates to a pigment preparation containing a mixture of coated or uncoated $Al_2O_3$ flakes, and one or more special-effect pigments, and a phosphate derivative, and to the use thereof, especially in printing inks.

22 Claims, No Drawings

PIGMENT PREPARATION AND ITS USE ESPECIALLY IN PRINTING INKS

SUMMARY OF THE INVENTION

The present invention relates to a pigment preparation containing coated and/or uncoated $Al_2O_3$ flakes, one or more special-effect pigments and a phosphate derivative and to its use, especially in printing inks.

Printing inks consist in general of binder, pigments or dyes and additives. In the case of printed products for printing packaging, labels and high-quality journals there is an ever-increasing requirement for luster to be given to the articles depicted.

Printing inks comprising luster pigments have partially the disadvantage that they feature problems with print-run stability. They have a tendency to build up rapidly on the inking unit, printing plate and rubber cloth, or else to sediment, so that a trouble-free print run of more than 10,000 sheets is generally not possible. A fundamental problem is the strong tendency of luster pigments, especially pearl luster pigments owing to their platelet like structure and the specific chemophysical surface properties, to form agglomerates in the printing ink, the pigments lying atop one another in stacks and being difficult to separate owing to their strong adhesion. In addition, the luster imparted to such prints is generally unsatisfactory, owing to the inadequate amount of pigments transferred to the printed product. The ink becomes depleted in pigment on its path via inking unit, plate and rubber cloth. The pigment accumulates at exposed areas on the plate and cloth and leads to caking and piling.

In general, special-effect pigments which are most suitable are those having a very small average particle size, since the particle size is critical for pigment transfer on printing. Pigments meeting this requirement exist only for pearly white and pastel shade-colorations, but not for the gold, silver, bronze and copper tones which are of very great interest. To date, in the offset process, it has frequently proved impossible to produce such tones satisfactorily using special-effect pigments.

The use of platelet-shaped bismuth oxychloride pigments to obtain a pearl luster effect likewise does not lead to satisfactory results, since the pigment particles are highly sensitive to mechanical shear forces and are broken down in the ink nip.

The use of pearl luster pigments in printing inks for offset printing is known from DE 29 03 212, which discloses the pigmentation of a customary commercial oil-based print varnish with a preferably very finely divided pearl luster pigment. The offset print varnish preparation described therein is notable for the fact that the proportion of pearl luster pigments is very high, the upper limit of the pigment concentration in the suspension being set essentially only by the required flowability of the mixture. The proportion of pearl luster pigments in that case is in the range up to 65% by weight. Varnishes having such a high proportion of pigment are highly viscous and may need to be rendered more flowable with a diluent in order to be able to be processed in conventional offset printing machines. In contrast to the teaching to date, experiments in DE 29 03 212 have shown that the transfer of pigment from the inking unit to the substrate is disrupted at such high levels of pigmentation. There are print-run defects, such as piling and caking, meaning that the achievable pearl luster effect cannot be optimized solely by high pigmentation. Furthermore, the ink systems of DE 29 03 212 generally exhibit in inadequate dot definition, so that the ink systems described therein are restricted essentially to the printing of solid areas.

The object was therefore to find a pigment preparation, especially for printing inks, which achieves not only relatively high pigmentation of the printing ink but also satisfactory print-run properties.

It has surprisingly been found that the quality of the gloss effect and the amount of transferred pigment particles in a printing ink becomes optimum if use is made of a pigment preparation which consists essentially of a mixture consisting of uncoated $Al_2O_3$ flakes or $Al_2O_3$ flakes coated with one or more metals, metal oxides or metal sulfides, and at least one further special-effect pigment and a phosphate derivative.

The invention hence provides a pigment preparation essentially consisting of uncoated $Al_2O_3$ flakes or $Al_2O_3$ flakes coated with one or more metals, metal oxides or metal sulfides and at least one further special-effect pigment and a phosphate derivative.

The most important constituent of the pigment preparation of the invention are the $Al_2O_3$ flakes, comprising platelet shaped $Al_2O_3$ substrates. Coated aluminum oxide in a flaky form is commercially available for example from Merck KGaA under the tradename Xirallic®.

$\alpha$-$Al_2O_3$ in the form of hexagonal flakes having a particle diameter greater than 10 $\mu$m and an aspect ratio (particle diameter/thickness) of 5–10 is known from JP 111239/1982 (Laid Open No.).

The Japanese Patent Publication No. 72527/1991 discloses $\alpha$-$Al_2O_3$ in the form of flakes having an average particle diameter of 0.5–3 $\mu$m.

The JP 39362/1992 (Laid Open No.) describes $Al_2O_3$ in the form of fine platy particles of a hexagonal crystal system with the plane perpendicular to the c axis grown into a plate.

Preferred $Al_2O_3$ flakes are flakes composed of aluminum oxide (as a major constituent) and of titanium dioxide (as a minor constituent) which are known from U.S. Pat. No. 5,702,519. These $Al_2O_3$ flakes are prepared from a uniform aqueous solution of water-soluble aluminum salt and titanium salt by hydrolysis with an alkali carbonate aqueous solution in the presence of an aqueous solution containing an alkali metal salt like alkali metal sulfate and phosphoric acid or phosphate, drying by evaporation (dehydration by heating), and molten salt treatment.

The $Al_2O_3$ flakes can be provided with one or more metal oxide layers. Examples of suitable metal oxides or metal oxide mixtures are titanium dioxide, zirconium oxide, zinc oxide, iron oxides and/or chromium oxide, especially $TiO_2$ and/or $Fe_2O_3$. The $Al_2O_3$ flakes can be coated in the same way like pearl luster pigments. Coating with a metal oxide or metal oxide mixture may be accomplished by any known methods, such as hydrolysis of a metal salt by heating or alkali, which deposits hydrated metal oxide, followed by calcination.

The $Al_2O_3$ flakes can also be coated with one or more metal oxide layers of a metal or metal alloy selected e.g. from chromium, nickel, silver, bismuth, copper, tin or hastalloy.

$Al_2O_3$ flakes can also be coated with sulfides e.g. of tungsten, molybdenum, cerium, lanthanum or rare earth elements.

The $Al_2O_3$ flakes can be coated by wet chemical coating, by CVD or PVD processes. The metal coating on the $Al_2O_3$ flakes functions to increase the hiding power of the pigment.

Special-effect pigments used are chosen preferably of customary commercial metal effect pigments, such as aluminum flakes, e.g. Stapa-Alupaste® from Eckart, special-effect pigments, such as Paliocrom® from BASF, BiOCl pigments, Liquid Crystal Polymer pigments (LCP), holographic pigments and pearl luster pigments—mica flakes coated with metal oxides—obtainable, for example, from Merck KGaA, Darmstadt, under the tradename Iriodin®. The latter are known, for example, from the German Patents and Patent Applications 14 67 468, 19 59 998, 20 09 566, 22 14 545, 22 15 191, 22 44 298, 23 13 331, 25 22 572, 31 37 808, 31 37 809, 31 51 343, 31 51 354, 31 51 355, 32 11 602 and 32 53 017. Pearl luster pigments and multilayer pigments are preferably used for the printing inks. In particular, $TiO_2$-and/or $Fe_2O_3$-coated $SiO_2$-flakes, mica pigments, $TiO_2$ flakes, glass flakes, ceramic flakes or synthetic platelets without a carrier are employed.

The pigment preparation consists of a mixture of different special-effect pigments in order, for example, to achieve particular colorations. The ratio of $Al_2O_3$ flakes to special-effect pigment is preferably from 10:1 to 1:10, more preferably 1:1.

In addition to the coated or uncoated $Al_2O_3$ flakes and the special-effect pigments, the pigment preparation of the invention may also include carbon black particles, fluorescent pigments and/or organic color pigments, phyllosilicates, $TiO_2$, $CaCO_3$, $CaSO_4$ and/or kaolin. In that case the preparation preferably consists of 30–99.9% by weight of $Al_2O_3$ flakes and special-effect pigments and 0–7% by weight of carbon black particles, fluorescent pigments and/or color pigments, based on the weight of the pigment preparation.

As a further important constituent, the pigment preparation of the invention comprises a phosphate derivative in amounts of preferably 0.1–10% by weight, more preferably 1–5% by weight. Suitable phosphate derivatives are, for example, the higher and lower polyphosphates, and also pyrophosphates. Particular preference is given to the alkali metal meta-polyphosphates, especially sodium hexameta-polyphosphate.

The pigment preparation is simple to prepare and easy to handle. First of all, the pigment mixture is mixed with a phosphate derivative which is either stirred in as a fine powder or added in the form of a suspension consisting of the salt and a liquid component. Particularly suitable liquid components are mineral oils or other non-drying oils, such as coconut oil, and also drying oils, such as soya oil or linseed oil, for example, and also water or organic solvents or solvent mixtures. The liquid component should, in that case, amount to not more than 30% by weight based on the pigment preparation. The pigment preparation can also be prepared by introducing all of the components simultaneously and then mixing them with one another without great shear forces. The finished pigment preparation can then be mixed into formulations such as printing inks, varnishes, paints, plastics and cosmetic formulations, for example.

In many cases it is advisable to stir a dispersant and/or redispersant into the pigment preparation. All dispersants known to the skilled worker can be used, as are described, for example, in Karsten, Lackrohstofftabellen, 9th edition 1992. Particularly suitable dispersants are those based on polyacrylates or polymethacrylates. The amount of dispersant employed should be not more than 10% by weight, preferably 0.1–5% by weight.

Examples of suitable redispersants - are phyllosilicates, especially those from the smectite series, such as the montmorillonite/bendellite series. These smectites are particularly notable for their pronounced swelling behavior. In commerce, these products are marketed, for example, under the tradename Laponite, a synthetic sodium-magnesium-lithium silicate, which is similar to hectorite, by Laporte UK or by Südchemie, FRG under the names Optigel® CG, a bentonite, or Tixogel® PE, an organophilic hydrophobicized smectite. Also suitable, however, are micaceous silicates of the vermiculite and the illite series, and also micas themselves (muscovite, phlogopite, biotite). What is critical is the platelet-shaped nature of the particles and their capacity for digestion in the spray drying process. In the case of surface modification it is also possible to employ mixtures of the said phyllosilicates, and also modified phyllosilicates. The phyllosilicates are preferably employed in an activated form; in other words, the silicates are dispersed in water, converted to a sol and then spray-dried.

The proportion of redispersant in the pigment preparation of the invention is from 0.05 to 5% by weight, preferably from 0.1 to 2.5% by weight and, in particular, from 0.2 to 1% by weight, based on the $Al_2O_3$/special-effect pigment content.

The pigment preparation of the invention is particularly suitable for pigmenting printing inks. Printing inks pigmented in this way can be used for all known printing techniques, especially for offset printing, relief printing, letterset printing, intaglio printing, flexographic printing and screen printing, and also for overprint varnishing and for coatings. It is preferably used for offset printing. In this context it can be used either for web-fed offset printing or for sheet-fed offset printing by the dry or wet process; it is particularly suitable, however, for wet-process sheet-fed offset printing.

The pigment preparation is dispersed in the printing ink or the binder in this case by means of a stirrer mechanism with a propeller or paddle stirrer, employing different dispersing temperatures if desired. In this process, the pigment particles become enveloped by the binder. The base inks thus obtained are subsequently made up to the finished product by adding the additives.

For the preparation of a pigmented offset printing ink it is possible to use all customary commercial binders. Such binders consist of known synthetic or natural resins, with or without drying oils, mineral oils and additives, as are described, for example, in Karsten, Lackrohstofftabellen, 9th edition 1992. The resins that are used preferably possess a relatively low melt or solvent viscosity. However, highly polymerized and high-viscosity components may also be present. It has been found particularly appropriate to use combinations of hard resins and alkyd resins, since these provide better wetting of the $Al_2O_3$ and effect pigments and give prints of greater gloss and rubfastness. The binders used are in particular those composed of 50–90% by weight of hard resin and 5–50% by weight of alkyd resin. The hard resins used are preferably hydrocarbon resins. The hydrocarbon resins employed may have an acid number close to 0 mg of KOH/g, of solids, or else they can be modified and have acid numbers of up to 30 mg of KOH/g of solids. The binder can, in addition, contain 1–50% by weight of a mineral oil. The ink components are matched to one another so as to achieve an ink/water balance which is stable and suitable for the low ink viscosity.

The printing ink is dried by oxidative polymerization of the resins and by means of oils, for example linseed oil, wood oil or castor oil, which pass into the paper in the course of printing. The drying operation can be accelerated further by additions of drying catalysts (siccatives), which are usually fatty acid salts of cobalt, lead, manganese, etc. The proportion of drying oils for example in the offset printing inks of the invention is in the range from 0–50% by weight, preferably 0–30% by weight. Further additives may be introduced into the printing ink in order to modify the ink properties for specific applications. These additives may be wax compounds, drying agents, dispersants, solvents, thickeners, lubricants, pigment fillers and/or antioxidants. Further details regarding the fundamental characteristics of for example offset printing inks can be found in A. Rosenberg, Der Polygraph (11), 1153(1987) or B. Grande, Coating (4), 138 (1987).

Frequently, very low-viscosity pigment-containing printing inks do not provide adequate dot definition. It is precisely this definition, however, which is necessary in fine screens in order to avoid clogging of the print. It is therefore advisable to provide the printing ink with structure. For instance, the addition of a structure former is able to bring about sufficient improvement in the dot definition. Preferably, the printing ink of the invention contains in this case 0.1–3% by weight of a structure former. In addition to the improved dot definition, a printing ink modified in this way displays markedly better pigment transfer and enhanced print-run properties.

By way of the choice of the resins in the binders and the proportion of luster pigments in the printing ink it is possible to adjust individually the parameters which are critical for the printing process, such as dispersability, tackiness and viscosity. For a given ink composition, viscosity and tackiness are mutually dependent, but may also be modified individually in a controlled manner through a specific ink composition. In this context it should be noted that printing inks having a too high degree of tackiness may give rise to sections of the paper tearing (picking). Inks of inadequate tackiness are not transferred in an appropriate manner in the course of the printing operation. If the penetration of the ink is too great, it becomes visible on the opposite side of the paper or causes blotchiness or lack of clarity in the reproduced image. Poorly controlled penetration may give rise to smearing and deposits. By contrast, excessively viscous inks will not flow appropriately from the filling sources to the rollers. Commercially available printing inks are formulated to viscosities in the range 12–200 Pa.s. Printing inks comprising the pigment preparation of the invention can be formulated to viscosities <15 Pa.s, preferably <12 Pa.s and, in particular, <10 Pa.s. This can be done without the printing ink exhibiting any problems in relation to spraying off from the inking rollers;, even at printing speeds of 10,000 sheets per hour or more.

Printing inks comprising the pigment preparation of the invention are of particular importance especially with regard to graphic products of the advertising sector and for high-quality printed products, since the gloss of the finished prints means that they meet the highest of aesthetic requirements.

The invention hence also provides printing inks which comprise up to 40% by weight, especially 10–30% by weight, of the pigment preparation of the invention.

The pigment preparation of the invention is likewise suitable as a precursor for a printing ink which contains $Al_2O_3$ flakes and special-effect pigments.

The pigment preparation of the invention can be used for filling tubes and for extrusion. To produce dry preparations, the pigment preparation of the invention is extruded or compacted in granular form by other methods known to the skilled worker, and if desired it is subsequently dried. The drying process generally takes place at temperatures from 20 to 150° C. between 0.5 and 4 h and can be carried out, if desired, under reduced pressure. If desired, in a final operation the dry preparation is comminuted. The resulting granules, which may contain up to 95% pigments, are likewise non-dusting and possess particle sizes of 0.1–80 mm, preferably 1–5 mm. The storage and transportation of the dry preparations are hence less restrictive and therefore highly unproblematic. The dry preparations possess the added advantage that they carry little or no liquid and can therefore be incorporated more readily into formulations.

The preparation of the invent ion, as a paste or as a dry preparation, can be used for diverse applications. It is preferably employed in coating systems from the print, paint and varnish sectors.

The pigment preparation of the invention is notable for its high luster and can therefore be employed for a very wide variety of purposes. In addition to its use in printing inks, it can also be employed in plastics, paints and varnishes.

The invention hence also provides formulations which contain the pigment preparation of the invention.

In the foregoing and in the following examples, all temperatures are set forth uncorrected in degrees Celsius; and, unless otherwise indicated, all parts and percentages are by weight.

The entire disclosure of all applications, patents and publications, cited herein are hereby incorporated by reference. Particularly, this application claims priority to European Patent Application 98124476.7, the entire text of which is hereby incorporated by reference. Additionally, U.S. patent applications having attorney docket numbers Merck 2050, Merck 2051, and Merck 2052 are hereby incorporated by reference.

EXAMPLES

Example 1

200 g of Laponite® RDS (product of Laporte, UK) are added with stirring at 40° C. to 1800 g of deionized water and stirring is continued for 1 hour at 700 rpm. The result is a sol having a viscosity of 12 seconds (4 mm DIN cup).

The sol is dried in an Atomizer Minor spray drier from Niro having a theoretical throughput of 5–7 l/h at 95–100° C. and 4 bar.

A mixture of 100 g of Iriodin® 123 bright luster satin ($TiO_2$/mica pigment of particle size 5–25 μm from Merck KGaA) and 150 g of $TiO_2$-coated $Al_2O_3$ flakes with a particle size 5–60 μm are dry-mixed with 3.8 g of spray-dried Laponite® RDS and 80 g sodium polyphosphate from Merck KGaA. The mixing time is 15 minutes. A homogeneous material is produced.

39 g of this homogeneous material are incorporated into 91 g of a binder, Synthacryl SW175 (40% strength solution of acrylic resin in $H_2O$/isopropanol 2:1) from Hoechst and the batch is adjusted with isopropanol to an outflow time of 21 +/−1 seconds. The pigment content is 22.3% by weight.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A pigment preparation comprising $Al_2O_3$ flakes, at least one special-effect pigment, and at least one phosphate compound, wherein the $Al_2O_3$ flakes are coated flakes, uncoated flakes, or a mixture of coated and uncoated flakes.

2. A pigment preparation according to claim 1, wherein at least a portion of the $Al_2O_3$ flakes comprise $Al_2O_3$ flakes coated with one or more metals, metal oxides or metal sulfides.

3. A pigment preparation according to claim 1, wherein the special-effect pigment is a pearl luster pigment, a coated iron oxide flake, an $SiO_2$ flake, a glass flake or a $TiO_2$ flake.

4. A pigment preparation according to claim 2, wherein the special-effect pigment is a pearl luster pigment, a coated iron oxide flake, an $SiO_2$ flake, a glass flake or a $TiO_2$ flake.

5. A pigment preparation according to claim 1, comprising 0.1 to 10% by weight of the phosphate compound.

6. A pigment preparation according to claim 2, comprising 0.1 to 10% by weight of the phosphate compound.

7. A pigment preparation according to claim 3, comprising 0.1 to 10% by weight of the phosphate compound.

8. A pigment preparation according to claim 1, further comprising at least one of carbon black particles, fluorescent pigments, organic color pigments, phyllosilicates, $CaCO_3$, $CaSO_4$, $TiO_2$, or kaolin.

9. A pigment preparation according to claim 2, further comprising at least one of carbon black particles, fluorescent pigments, organic color pigments, phyllosilicates, $CaCO_3$, $CaSO_4$, $TiO_2$, or kaolin.

10. A pigment preparation according to claim 3, further comprising at least one of carbon black particles, fluorescent pigments, organic color pigments, phyllosilicates, $CaCO_3$, $CaSO_4$, $TiO_2$, or kaolin.

11. A pigment preparation according to claim 1, wherein the pigment preparation contains not more than 30% by weight of a liquid component.

12. A pigment preparation according to claim 2, wherein the pigment preparation contains not more than 30% by weight of a liquid component.

13. A pigment preparation according to claim 1, wherein the phosphate is a higher or lower polyphosphate, or pyrophosphate.

14. A pigment preparation according to claim 13, wherein the phosphate compound is an alkali metal metapolyphosphate.

15. A method of manufacturing a pigment formulation comprising providing a pigment preparation according to claim 1 and adding the pigment preparation to a formulation to obtain a printing ink, a varnish, a paint, a plastic or a precursor for a printing ink.

16. A method of manufacturing a pigment formulation comprising providing a pigment preparation according to claim 2 and adding the pigment preparation to a formulation to obtain a printing ink, a varnish, a paint, a plastic or a precursor for a printing ink.

17. A printing preparation comprising offset printing ink that contains a pigment preparation according to claim 1 in an amount up to 50% by weight.

18. A printing preparation comprising offset printing ink that contains a pigment preparation according to claim 2 in an amount up to 50% by weight.

19. A printing ink, a varnish, a paint, a plastic or a precursor for a printing ink comprising a pigment preparation according to claim 1.

20. A pigment formulation comprising a pigment preparation according to claim 1 and a binder, wherein the pigment formulation is substantially solvent-free, and wherein the pigment formulation is substantially in the form of free-flowing granules.

21. A pigment formulation comprising a pigment preparation according to claim 2 and a binder, wherein the pigment formulation is substantially solvent-free, and wherein the pigment formulation is substantially in the form of free-flowing granules.

22. A printing ink, a varnish, a paint, a plastic or a precursor for a printing ink, comprising a pigment preparation according to claim 1.

* * * * *